United States Patent [19]

Cragun

[11] Patent Number: 5,775,493

[45] Date of Patent: Jul. 7, 1998

[54] ASSEMBLY AND METHOD FOR LABELING AND STORING MEDIA CARTRIDGES

[75] Inventor: Brian John Cragun, Rochester, Minn.

[73] Assignee: International Business Machines Corporation, Armonk, N.Y.

[21] Appl. No.: 339,531

[22] Filed: Nov. 15, 1994

[51] Int. Cl.$^6$ ............................................. B43L 15/00
[52] U.S. Cl. ................................. 206/308.3; 248/118.1
[58] Field of Search ........................ 211/40, 41; 248/311.2, 248/118, 118.1, 118.3, 118.5, 918; 224/926; 206/387.15, 308.1

[56] References Cited

U.S. PATENT DOCUMENTS

| | | | |
|---|---|---|---|
| D. 360,894 | 8/1995 | Volk | D19/52 |
| 664,726 | 12/1900 | Cutter | 101/40 |
| 775,257 | 11/1904 | Steele et al. | 101/9 |
| 1,119,997 | 12/1914 | Smith | 101/401.1 |
| 4,009,781 | 3/1977 | Agnew | 206/387.15 |
| 4,121,877 | 10/1978 | Brown | 211/40 |
| 4,180,299 | 12/1979 | Tolerson | 206/387.15 |
| 4,253,567 | 3/1981 | Goldammer | 206/387 |
| 4,366,903 | 1/1983 | Gaiser | 211/40 |
| 4,383,610 | 5/1983 | Boshears | 206/387.15 |
| 4,781,292 | 11/1988 | Sacherman | 211/40 |
| 4,867,311 | 9/1989 | Metcalf | 206/444 |
| 5,096,152 | 3/1992 | Christiansen | 248/311.2 |
| 5,180,058 | 1/1993 | Hu | 211/40 |
| 5,340,067 | 8/1994 | Martin | 248/918 |
| 5,399,398 | 3/1995 | Toshimitsu | 211/41 |
| 5,433,407 | 7/1995 | Rice | 248/118.1 |

*Primary Examiner*—Ramon O. Ramirez
*Assistant Examiner*—Gwendolyn W. Baxter
*Attorney, Agent, or Firm*—Andrew J. Dillon

[57] ABSTRACT

A method and apparatus for labeling media cartridges are disclosed, which include an assembly having a substantially planar surface suitable for supporting a hand while writing. A slot which is sized to accommodate a media cartridge is formed in the assembly substantially perpendicular to the substantially planar surface, such that an edge of a media cartridge is flush with the substantially planar surface when the media cartridge is inserted into the slot. The assembly enhances the facility of writing on the edge of the media cartridge since the substantially planar surface supports a hand in a natural manner. In a preferred embodiment of the present invention, recesses are formed within the substantially planar surface on opposing sides of the slot to allow a user to easily insert and remove a media cartridge from the slot by grasping an edge of the media cartridge. A preferred embodiment of the present invention also includes spring-like clips disposed within the slot to secure a media cartridge in a fixed position while a user is writing. The assembly of the present invention may be incorporated into other surfaces to provide additional functionality. For example, in a preferred embodiment of the present invention, the assembly of the present invention is molded into the cover of a computer diskette storage box.

14 Claims, 4 Drawing Sheets

ASSEMBLY AND METHOD FOR LABELING AND STORING MEDIA CARTRIDGES

BACKGROUND OF THE INVENTION

1. Technical Field

The present invention relates in general to a method and system for labeling media cartridges and in particular to an improved method and system for facilitating writing on an edge of a media cartridge.

2. Description of the Related Art

Media cartridges such as diskettes, audio cassettes, video cassettes, and CD-ROMs are commonly utilized to store information. Such media cartridges are useful due to their portability and due to the fact that the contents stored on the media cartridges may be written over with new information when the stored information is no longer needed.

For convenience, media cartridges like those described above are stored in file containers, with the cartridges resting on their narrow edges. A label is often affixed to the narrow edges of media cartridges stored in this manner so that the contents of the media cartridges may be identified by scanning the labels, rather than by removing individual media cartridges from the file and reading the label on the media cartridge's broad surface. For example, 3½" computer diskettes are often identified either with a printed label or handwritten label affixed to the narrow edge of the diskette.

However, for media cartridges like 3½" diskettes, which have a narrow edge, labeling is often difficult. Since the edge of a 3½" diskette is very narrow (approximately ⅛"), printing by hand on the edge is difficult both because of the narrow width and because of the lack of a flat surface on which a user may rest his or her hand while writing. As a result, printing a label by hand on the edge of a diskette is time consuming, and the results are often illegible. Another option is to first print the label, and then affix it to the diskette. This process is needlessly time consuming since it takes time to align the label correctly, or to remove and reattach the label if the label is misaligned.

Mechanized systems for printing on narrow, raised surfaces, such as book spines and pencils, are known in the art. However, because these mechanized systems require extensive set-up prior to use, they are suitable only for mass production of similarly labeled objects, and therefore do not provide a user with an efficient means for labeling a single media cartridge.

Consequently, it would be desirable to have an improved system for labeling media cartridges, which enhances the facility of writing on the edge of a media cartridge.

SUMMARY OF THE INVENTION

It is therefore one object of the present invention to provide a method and system for labeling media cartridges.

It is another object of the present invention to provide a method and system for writing on an edge of a media cartridge.

It is yet another object of the present invention to provide a method and system which enhance the facility of writing on an edge of a media cartridge by securing the media cartridge so that an edge of the media cartridge is flush with a planar writing surface.

The foregoing objects are achieved as is now described. A method and apparatus for labeling media cartridges are disclosed, which include an assembly having a substantially planar surface suitable for supporting a hand while writing. A slot which is sized to accommodate a media cartridge is formed in the assembly substantially perpendicular to the substantially planar surface, such that an edge of a media cartridge is flush with the substantially planar surface when the media cartridge is inserted into the slot. The assembly enhances the facility of writing on the edge of the media cartridge since the substantially planar surface supports a hand in a natural manner.

In a preferred embodiment of the present invention, recesses are formed within the substantially planar surface on opposing sides of the slot to allow a user to easily insert and remove a media cartridge from the slot by grasping an edge of the media cartridge. A preferred embodiment of the present invention also includes spring-like clips disposed within the slot to secure a media cartridge in a fixed position while a user is writing. The assembly of the present invention may be incorporated into other surfaces to provide additional functionality. For example, in a preferred embodiment of the present invention, the assembly of the present invention is molded into the cover of a computer diskette storage box.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
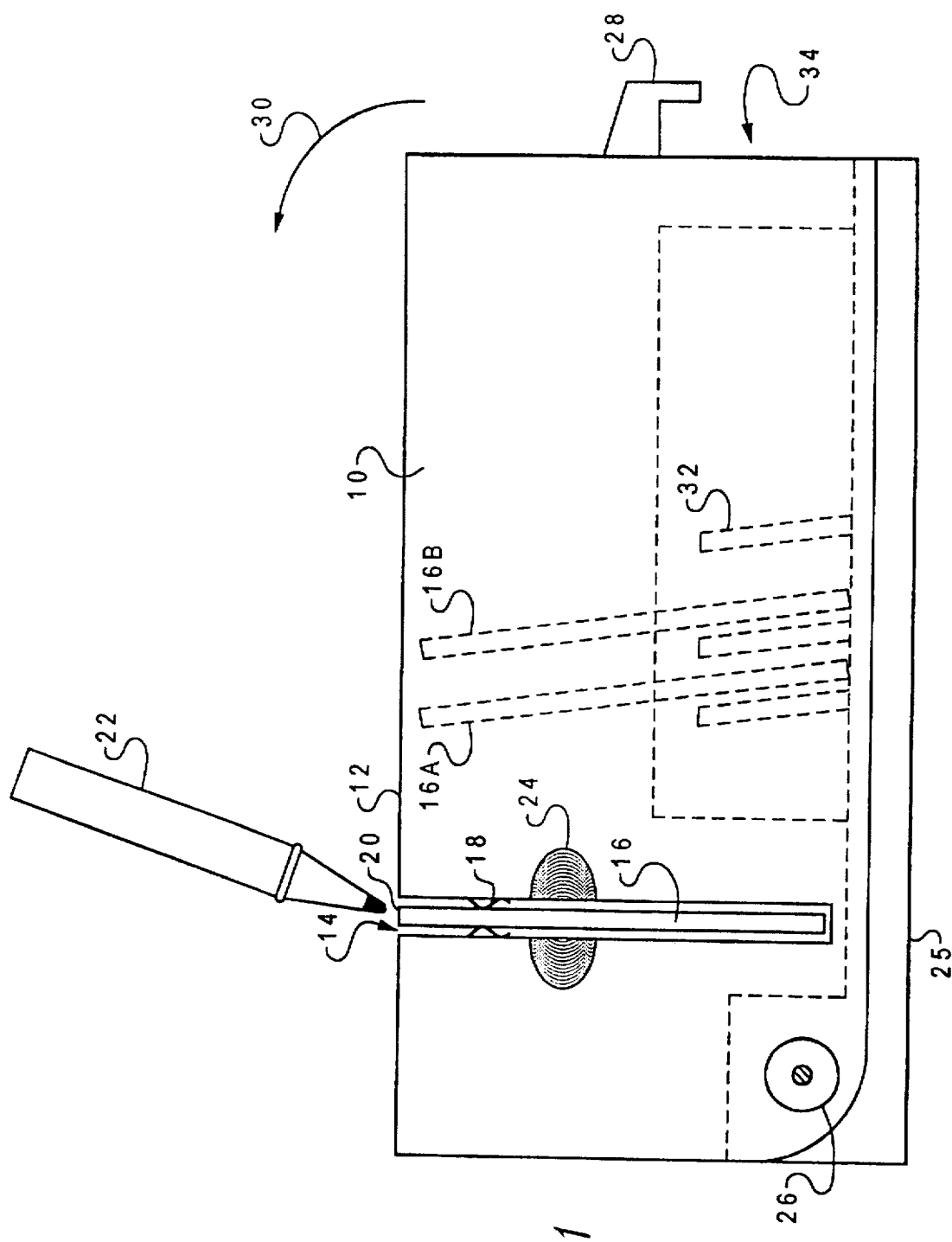
FIG. 1 illustrates a side elevation view of a preferred embodiment of the present invention.

With reference now to the figures and in particular with reference to FIG. 1, there is illustrated a side elevation view of a preferred embodiment of the present invention. As depicted, slot 14 is provided within assembly 10, which includes substantially planar surface 12. Slot 14 is perpendicular to planar surface 12, and is sized to accommodate media cartridge 16, which in a preferred embodiment comprises a 3½" computer diskette. When media cartridge 16 is inserted into slot 14, edge 20 of media cartridge 16 is flush with surface 12. One or more clips 18 are optionally provided within slot 14 to secure media cartridge 16 in a fixed position, since slot 14 is sized slightly larger than media cartridge 16 to provide clearance.

Since edge 20 of media cartridge 16 is flush with surface 12, a user may write on edge 20 utilizing pen 22 in a natural manner. Although the text must still be printed smaller than the ⅛" width of edge 20, labeling media cartridge 16 is facilitated by utilizing the present invention since a user's hand is supported by surface 12 in a manner in which the user is accustomed.

In the preferred embodiment depicted in FIG. 1, assembly 10 comprises the cover of computer diskette storage box 34. Assembly 10 is attached to base 25 at pivot 26, thereby enabling assembly 10 to rotate around pivot 26 in the direction indicated by arrow 30 when a user lifts assembly 10 utilizing handle 28. Spreaders 32 are provided within base 25 to support media cartridges 16A and 16B in an upright position and to allow a user to organize a plurality of media cartridges stored within computer diskette storage box 34. Computer diskette storage box 34 is preferably formed by injection or vacuum molding a suitable plastic material such as polycarbonate plastic, a transparent, rigid, and machinable material. Utilizing polycarbonate or other similar material would enable computer diskette storage box 34 to be inexpensively manufactured and assembled from a minimum of individual parts.

Figure 4:
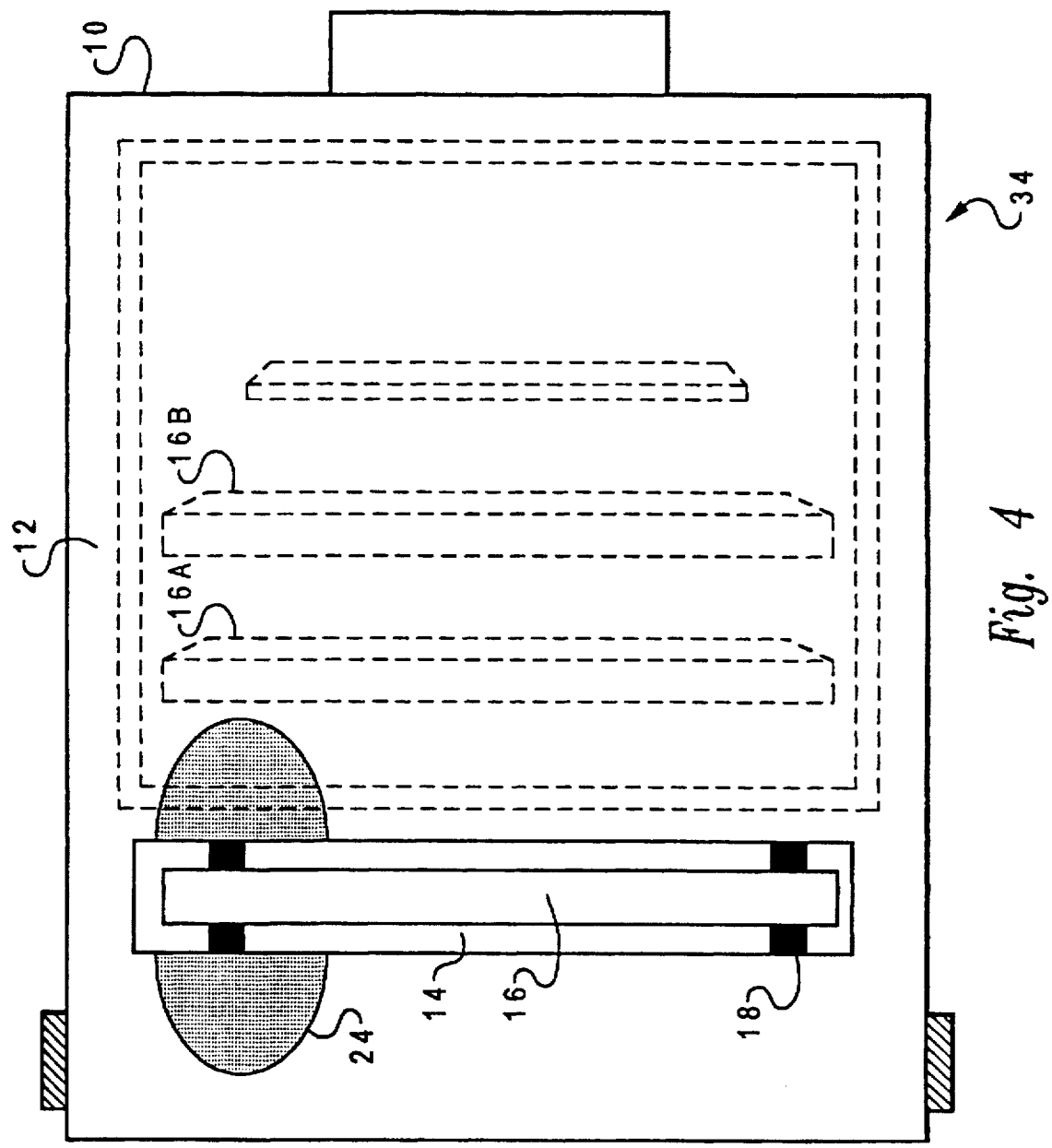
FIG. 4 depicts a top plan view of a second embodiment of the present invention.

Within assembly 10, recesses 24 are also provided to enable a user to easily insert and remove media cartridge 16 from slot 14. As would be recognized by one skilled in the art, recesses 24 could be configured in various shapes and could be located either on the side of assembly 10, as illustrated in FIG. 1, or along slot 14 on planar surface 12, as depicted in FIG. 4. In other embodiments of the present invention in which slot 14 extends across the entire width of assembly 10, recesses 24 could be provided on both sides of assembly 10.

Figure 2:
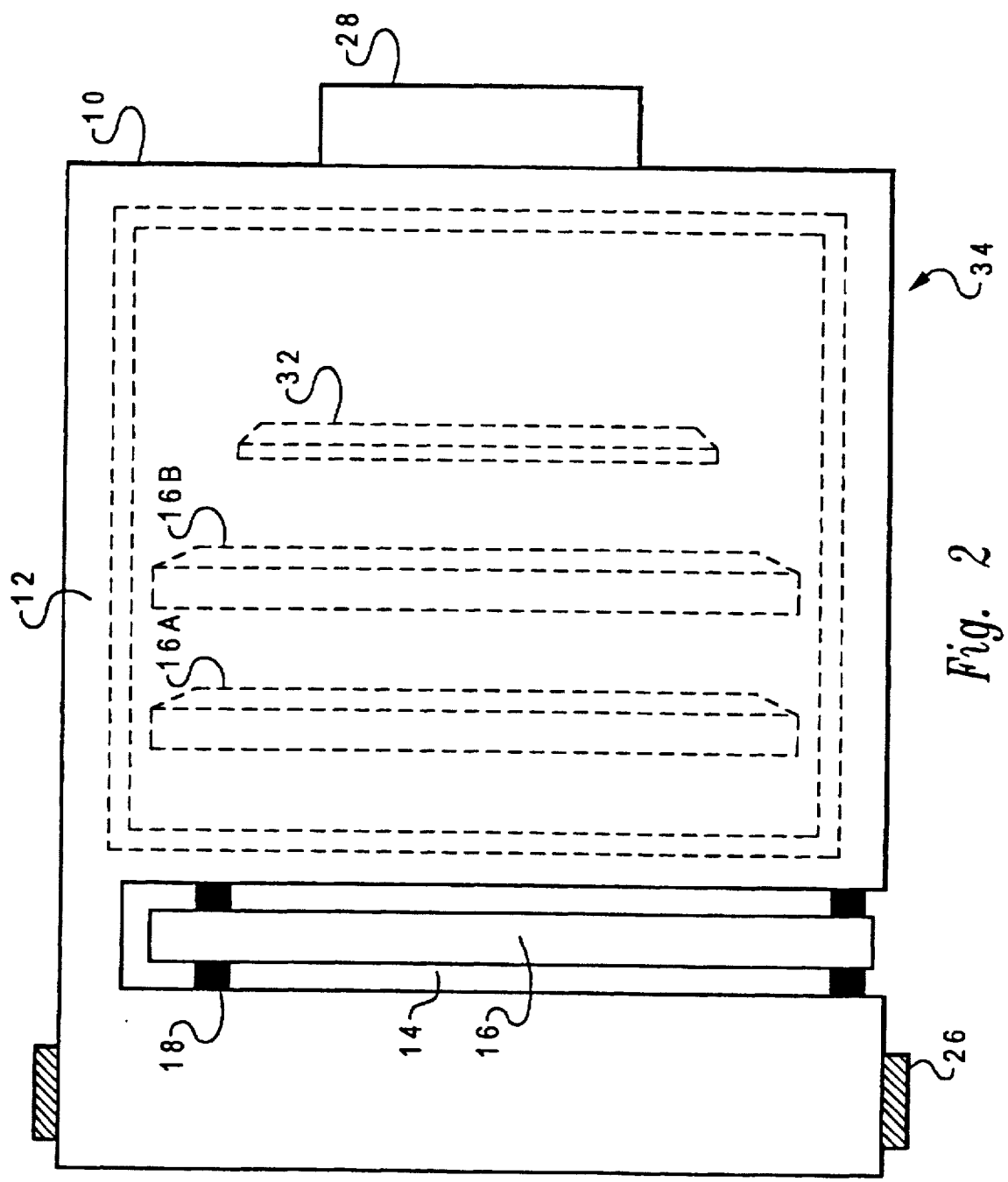
FIG. 2 depicts a top plan view of a preferred embodiment of the present invention.

Referring now to FIG. 2, there is depicted a top plan view of the preferred embodiment of the present invention illustrated in FIG. 1. FIG. 2 depicts the configuration of slot 14, as well as the arrangement of clips 18, which secure media cartridge 16 in slot 14. Although FIG. 2 illustrates an embodiment in which opposing pairs of clips 18 are utilized, those skilled in the art will recognize that in other embodiments, clips 18 could be located on only one side of slot 14, thereby preventing movement of media cartridge 16 during the writing process by pressing media cartridge 16 against the opposing wall of slot 14.

Figure 3:
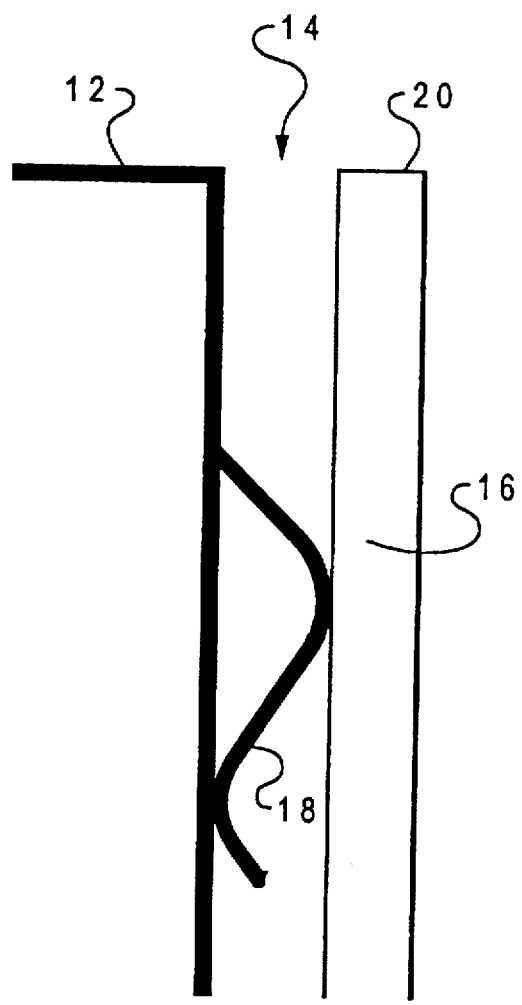
FIG. 3 illustrates a preferred embodiment of a clip mechanism which may be utilized to secure a media cartridge in a preferred embodiment of the present invention.

With reference to FIG. 3, there is illustrated an enlarged view of one of clips 18. As depicted, clips 18 are long, narrow, spring-like members, which secure media cartridge 16 in a fixed position in order to hold edge 20 stationary during the writing process. Clips 18 are preferably formed together with assembly 10, utilizing a process such as injection molding, in order to reduce manufacturing cost.

Referring now to FIG. 4, there is depicted a second embodiment of the present invention. The second embodiment is much like the first embodiment illustrated in FIGS. 1 and 2, but unlike the first embodiment, slot 14 is accessible only from planar surface 12 in the second embodiment. In addition, recesses 24 are located within planar surface 12 on opposing sides of slot 14. In other embodiments, recesses 24 may be centered along the long sides of slot 14, or located on the opposing narrow sides of slot 14.

A salient feature of the present invention is that it may be combined with other functional surfaces, thereby enhancing their value. As has been described, the assembly of the present invention could easily be molded into the cover of a diskette storage box, giving it a dual purpose and additional marketability. Similarly, the present invention may be utilized in conjunction with storage containers for video and audio cassettes and CD-ROMS, as well as desktop organizers and other office products.

While the invention has been particularly shown and described with reference to a preferred embodiment, it will be understood by those skilled in the art that various changes in form and detail may be made therein without departing from the spirit and scope of the invention.

I claim:

1. A method of labeling media cartridges, said method comprising:

providing an assembly having a substantially planar surface suitable for supporting a hand while hand writing;

forming a slot sized to accommodate a media cartridge, said slot being formed in said substantially planar surface and substantially perpendicular to a plane containing said substantially planar surface such that an edge of the media cartridge is flush with said substantially planar surface when the media cartridge is inserted into said slot;

inserting the media cartridge into said slot;

securing the media cartridge in a fixed position utilizing a spring-arm member disposed within said slot; and writing by hand on said edge of the media cartridge.

2. The method of claim 1, wherein forming a slot sized to accommodate a media cartridge comprises forming a slot having at least two opposing sidewalls connected to the substantially planar upper surface and a bottom surface connecting said at least two sidewalls.

3. A media cartridge storage device, comprising:

a substantially box-shaped assembly having a selectively openable aperture and a substantially planar upper surface, wherein a plurality of media cartridges may be stored within said substantially box-shaped assembly;

a slot formed in said substantially planar upper surface and substantially perpendicular to a plane containing said substantially planar upper surface, said slot being sized to accommodate a media cartridge such that an edge of the media cartridge is flush with said substantially planar upper surface when the media cartridge is inserted into said slot; and a spring-arm member disposed within said slot for securing the media cartridge in a fixed position, wherein facility of hand writing on said edge of the media cartridge is enhanced.

4. The media cartridge storage device of claim 3, wherein said substantially box-shaped assembly is formed from polycarbonate plastic.

5. The media cartridge storage device of claim 3, wherein said substantially planar upper surface includes recesses disposed at opposing edges of said slot to facilitate insertion and removal of the media cartridge from said slot.

6. The media cartridge storage device of claim 3, and further comprising the media cartridge, wherein the media cartridge is a computer diskette and said slot has at least two opposing sidewalls connected to said substantially planar upper surface and a bottom surface connecting said at least two sidewalls, a distance between said bottom surface and said substantially planar surface being substantially equal to a length of a first dimension of said computer diskette.

7. The media cartridge storage device of claim 3, said substantially box-shaped assembly having a side surface, wherein said slot is formed in said side surface.

8. The media cartridge storage device of claim 7, wherein said side surface includes recesses disposed at opposing edges of said slot to facilitate insertion and removal of the media cartridge.

9. An apparatus for labeling media cartridges, comprising:

an assembly having a substantially planar surface suitable for supporting a hand while hand writing; and a slot formed in said substantially planar surface and substantially perpendicular to said substantially planar surface, said slot being sized to accommodate a media cartridge such that an edge of the media cartridge is flush with said substantially planar surface when the media cartridge is inserted into said slot; and a spring-arm member disposed within said slot for securing the media cartridge in a fixed position, wherein facility of hand writing on said edge of the media cartridge is enhanced.

10. The apparatus for labeling media cartridges of claim 9, and further comprising the media cartridge, wherein the media cartridge is a computer diskette and said slot has at least two opposing sidewalls and a bottom surface connecting said at least two sidewalls, a distance between said bottom surface and said substantially planar surface being substantially equal to a length of a first dimension of said computer diskette.

11. The apparatus for labeling media cartridges of claim 9, wherein said substantially planar surface includes recesses disposed at opposing edges of said slot to facilitate insertion and removal of the media cartridge from said slot.

12. The apparatus for labeling media cartridges of claim 9, wherein said assembly is formed from polycarbonate plastic.

13. The apparatus of claim 9, said slot having at least two opposing sidewalls connected to said substantially planar upper surface and a bottom surface connecting said at least two sidewalls.

14. An apparatus for labeling media cartridges, comprising:

an assembly having a substantially planar surface suitable for supporting a hand while hand writing and a side surface; and a slot formed in both said substantially planar surface and said side surface, wherein said slot is substantially perpendicular to said substantially planar surface, said slot being sized to accommodate a media cartridge such that an edge of the media cartridge is flush with said substantially planar surface when the media cartridge is inserted into said slot, wherein facility of hand writing on said edge of the media cartridge is enhanced.

* * * * *